United States Patent [19]

Hertrich

[11] 3,772,665

[45] Nov. 13, 1973

[54] SYSTEM FOR LOADING AND POSITIONING A TRANSDUCER IN A DATA STORAGE DISC CARTRIDGE

[75] Inventor: Friedrich R. Hertrich, Boulder, Colo.

[73] Assignee: Iomec Incorporated, Santa Clara, Calif.

[22] Filed: Mar. 31, 1972

[21] Appl. No.: 240,068

[52] U.S. Cl. .......................... 340/174.1 C, 346/137

[51] Int. Cl. ............................................ G11b 5/54

[58] Field of Search ................................. 206/62 R; 179/100.2 Z, 100.2 CA; 346/137; 340/174.1 C

[56] References Cited

UNITED STATES PATENTS 3,544,980 12/1970 Applequist et al. .......... 340/174.1 C 3,526,884 9/1970 Boslik et al. ................ 340/174.1 C

*Primary Examiner*—Vincent P. Canney

*Attorney*—Stephen S. Townsend et al.

[57] ABSTRACT

A disc cartridge has a cutout at its periphery and a rigid interior plate that overlies the rotating disc. The plate has flat guide surfaces that straddle a slot extending from adjacent the opening towards the center of the plate. Ramps are laterally spaced with respect to the surfaces at their peripheral end and form a guide from the opening to the flat surfaces. A linearly movable transducer mounted to an end of a leaf spring is biased against the ramp and the guide surfaces. The guide surfaces thereby accurately position the transducer in close proximity to the disc. Means is also provided for maintaining the opening normally covered.

24 Claims, 7 Drawing Figures

PATENTED NOV 13 1973 3,772,665

SHEET 1 OF 2

SYSTEM FOR LOADING AND POSITIONING A TRANSDUCER IN A DATA STORAGE DISC CARTRIDGE

BACKGROUND OF THE INVENTION

Data storage disc drives employ disc cartridges within which there rotates a magnetic data storage disc or the like. A recording or pickup transducer is moved into the cartridge along a straight radial line with a conventional linear motor.

The spacing between the rotating disc and the transducer is critical for proper data pickup or recording. It has been common practice to mount a positioning ramp or solenoid operated linkage to the support structure for the cartridge for controlling the spacing between the rotating disc and the transducer. By necessity the transducer is cantilevered. Thus, even minute tolerances in the positioning structure or linkage is translated into substantial differences in the positioning of the transducer which in turn might interfere with the proper data pickup by the transducer. Consequently, the positioning ramp or linkage had to be constructed with the utmost accuracy which made them expensive.

A further drawback experienced with these types of transducer positioning devices is that they are subject to wear and tear each time the transducer is actuated. They either have to be constructed of high grade, expensive material and/or they require relatively frequent replacement to prevent wear from adversely affecting the accuracy with which the transducer is positioned.

SUMMARY OF THE INVENTION

The present invention provides a transducer positioning device which is part of each cartridge and in which the positioning takes place in the immediate vicinity of the transducer instead of at a point remote therefrom as was common in the past. Much greater positioning accuracy can thereby be obtained with less stringent manufacturing tolerances. Moreover, the wear and tear is distributed evenly among all cartridges in use so that replacement is infrequent or eliminated.

Speaking generally, a system constructed in accordance with the invention for the registration of a linearly movable transducer with respect to a recording disc in a disc cartridge comprises a rigid plate inside the cartridge that has a sloped ramp at its periphery. Flat rail means extends parallel to the ramp from about an inner end thereof towards the center of the plate and is disposed in a plane that is parallel to the plane of the rotating disc. Means is further provided and connected to the transducer carriage for biasing a holder for the transducer against the ramp and the rail means as the transducer moves linearly towards the center of the plate to thereby position the transducer and control its spacing from the disc.

In the preferred embodiment of the invention the cartridge comprises a housing that defines a space for rotating the disc and a rigid center plate overlying that space and including an elongate slot extending radially from adjacent the periphery of the housing towards the center thereof. The housing includes an access opening aligned with the slot and positioned to provide communication to the housing interior on the side of the disc facing away from the space in which the disc rotates. That side of the plate defines the rail means as an elongate, flat guide surface on each side of the slot that extends past the slot ends. The ramps are relatively short and laterally spaced from the guide surfaces. They slope from a high point at the plate periphery to substantial planar alignment with the guide surfaces. The transducer can thereby slide down the ramps for placement on the guidance surfaces and for positioning and registration with respect to the rotating disc.

A holder for the transducer is mounted to an elongate lead spring secured to the linear positioning motor. A free end of the leaf spring mounts the holder for linear movement of the transducer past the cartridge opening and into the cartridge in alignment with the slot in the plate. The spring is curved so that its free end, and therewith the transducer and the holder intercept the ramps and the flat guiding surfaces. The spring thereby biases the holder into constant engagement with the ramps and the guiding surfaces so that the guiding surfaces determine the spacing between the transducer and the rotating disc. Thus, great accuracy is obtained without requiring correspondingly stringent manufacturing tolerances.

Furthermore, means is provided for normally covering the opening. This means preferably comprises an L-shaped leaf spring extending from about the center of the plate in the cartridge to the periphery thereof. A first portion of the spring is disposed on the interior of the housing above the plate and a second portion is on the exterior of the housing and closes the opening. An aperture of the housing overlies the first portion. The disc drive includes a reciprocally movable member such as a small ram or push rod to depress the first spring portion beneath the housing aperture. This automatically raises the second spring portion and thereby uncovers the access opening to the cartridge interior. As soon as the pin is retracted, the spring automatically closes the opening. During non-use of the cartridge, therefore, the opening is always closed.

The above-described transducer positioning system eliminates the heretofore common, cumbersome cantilevered transducer positioning devices. Initial installation costs as well as operating costs and accuracy are thereby substantially enhanced. Furthermore, disc drive down times due to excessively worn transducer positioning ramps or linkages and, for example, unavailable replacement parts or the like are substantially eliminated to further increase the economics of operating the disc drive in accordance with the invention.

DESCRIPTION OF THE PREFERRED EMBODIMENTS

Figures 1, 2, 7:
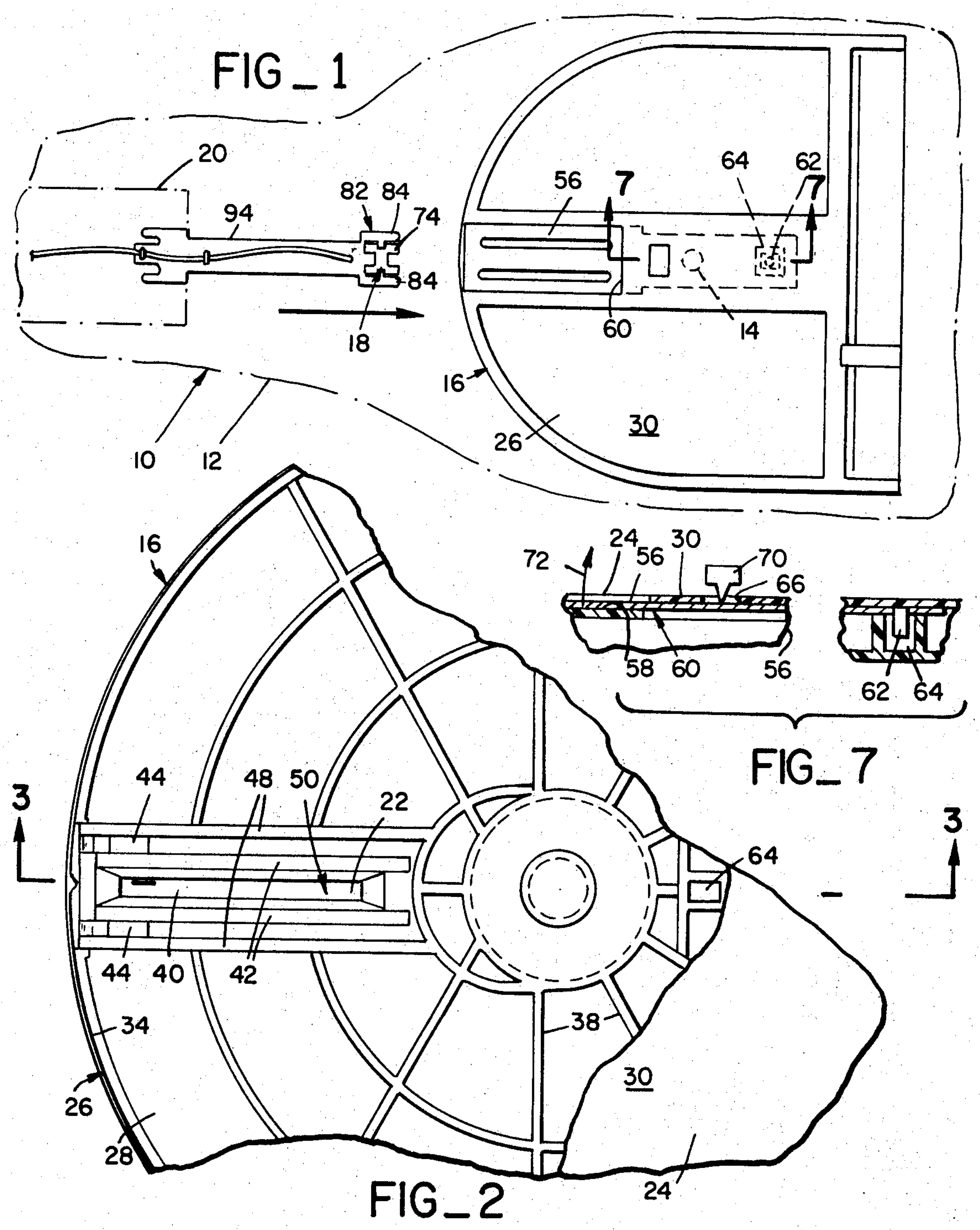
FIG. 1 is a fragmentary plan view of a disc cartridge and a linear transducer positioning device constructed in accordance with the present invention.
FIG. 2 is an enlarged, fragmentary plan view, with parts broken away, of the cartridge illustrated in FIG. 1 and shows details of the interior of the cartridge.
FIG. 7 is a fragmentary, enlarged cross-sectional elevational view showing details of the self-closing cover for the cartridge access opening and is taken on line 7—7 of FIG. 1.

Referring to FIG. 1, a data storage disc drive 10 generally comprises a support structure 12, a drive mechanism 14 (schematically illustrated only), a cartridge 16 and a transducer 18 for recording and retrieving information from a data storage disc (not shown in FIG. 1) inside the cartridge. A linear positioning motor 20 moves the transducer linearly and radially with respect to the drive mechanism towards and away from the center of rotation of the disc.

Figure 3:
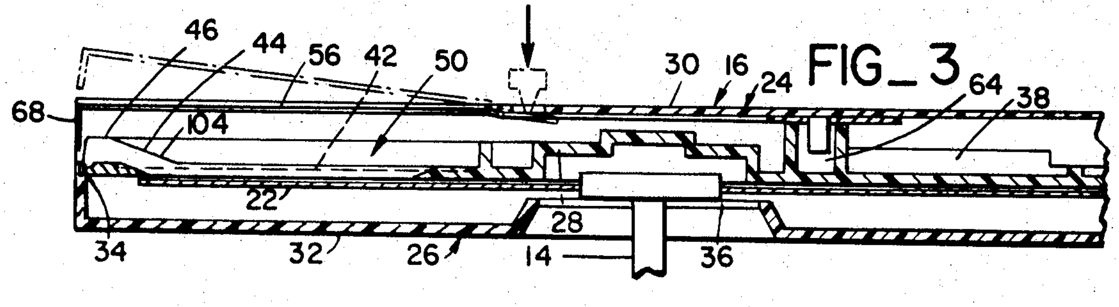
FIG. 3 is a fragmentary side-elevational view, in section, and is taken on line 3—3 of FIG. 2 and illustrates the opening of a leaf spring that normally covers an access opening of the cartridge.

Referring to FIGS. 1–3, the present invention provides means for accurately positioning the transducer with respect to a rotating data storage disc 22. To this end, cartridge 16 is constructed of an upper and lower half 24 and 26, respectively, which are suitably retained to each other. A rigid circular plate 28 is disposed inside the cartridge and is spaced from respective cartridge faces 30, 32 by ribs (not separately shown) and a ledge 34 in the lower cartridge half. A space 36 within which disc 22 can rotate is thereby formed.

The upwardly facing side of plate 28 includes a plurality of stiffening ribs 38 and an elongate slot 40 that extends radially from the center of the plate, which is also the center of rotation of the disc, towards the periphery of the plate. A relatively narrow, flat guide surface is on each side of the slot and extends beyond the slot parallel thereto. The guide surfaces are recessed from the upper plate surface and the spacing between the guide surfaces and the underside of the plate is accurately controlled.

Referring now to FIGS. 1–4, a pair of relatively short ramps 44 is disposed laterally of guide surfaces 42. A high point 46 of the ramps is in close proximity to the plate periphery (see particularly FIG. 4) and the ramp slopes downwardly at an angle of about 15°–30° until it intersects the upper side of the plate. Lastly, a pair of upright walls 48 on the outside of the ramps extend parallel to slot 40 from the plate periphery towards the center to define and enclose a transducer passageway 50.

Referring to FIGS. 1–4 and 7, upper cartridge half 24 defines an opening 52 in its side 54 which is aligned with slot 40 and passageway 50. An L-shaped leaf spring 56 maintains access opening 52 normally closed.

Face 30 of the upper cartrideg half includes a recessed portion 58 which extends towards the center of the cartridge and ends at a transverse slit 60. Positioned some distance past the center of the cartridge and extending into the cartridge interior towards plate 28 is an anchor pin 62. The long leg of the leaf spring extends from the cartridge periphery in recessed cartridge portion 58 through slit 60 and hence interiorly of the cartridge past the anchor pin. The interior end of the spring includes a snugly fitting aperture through which anchor pin 62 extends. Furthermore, plate 28 includes a socket 64 aligned with the anchor pin and positioned so that when the cartridge halves are assembled the free leaf spring end is firmly held against the interior of the upper cartridge half. This assures constant engagement of the spring by the anchor pin.

Face 30 of the upper cartridge half includes an aperture 66 positioned inwardly of slit 60 to overlie the interiorly located portion of the leaf spring. In use the flat leaf spring is supported by the interior and exterior portions of the upper cartridge housing, pin 62 and socket 64. Short leg 68 of leaf spring thereby covers access opening 52. To uncover the access opening a ram 70 or the like carried by support structure 12 of the disc drive is forced downwardly (in the direction of the arrow in FIG. 7) to deflect the interiorly located portion of the spring and thereby pivot the exterior portion about the axis of slit 60 in the direction of arrow 72 in FIG. 7. This lifts short spring leg 68 (as illustrated in FIG. 3) and enables access to the cartridge interior through opening 52. Release of the force applied by the ram permits the spring to return to its relaxed position and automatically closes opening 52.

Figures 4, 5:
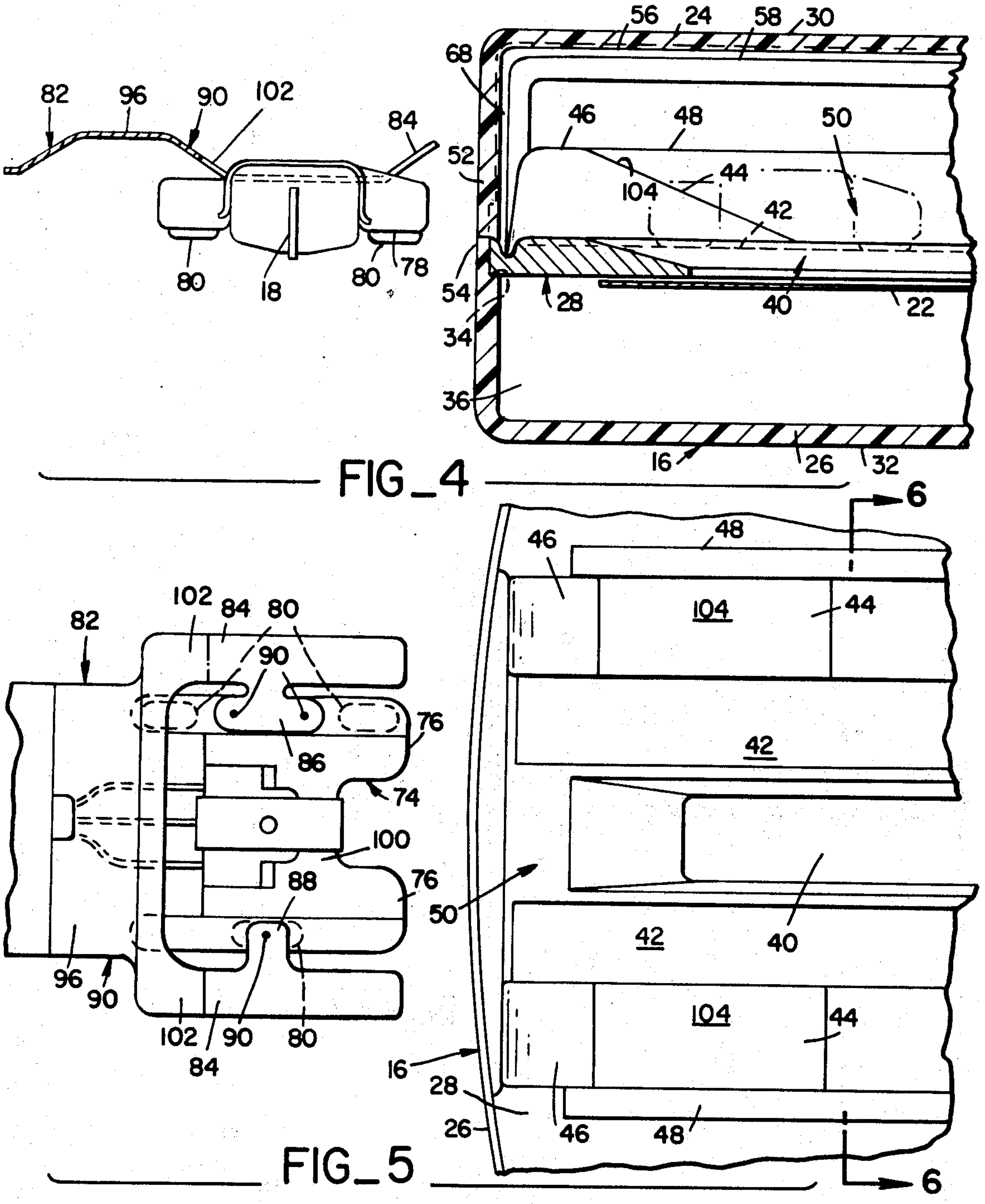
FIG. 4 is a still further enlarged, fragmentary cross-sectional side-elevational view of a transducer, transducer mount and the portion of the cartridge which the transducer enters initially and shows in phantom lines the progression of a transducer entering the housing.
FIG. 5 is a fragmentary plan view of the rigid interior cartridge plate and the transducer mount of FIG. 4 but with the cartridge housing deleted for clarity.
Figure 6:
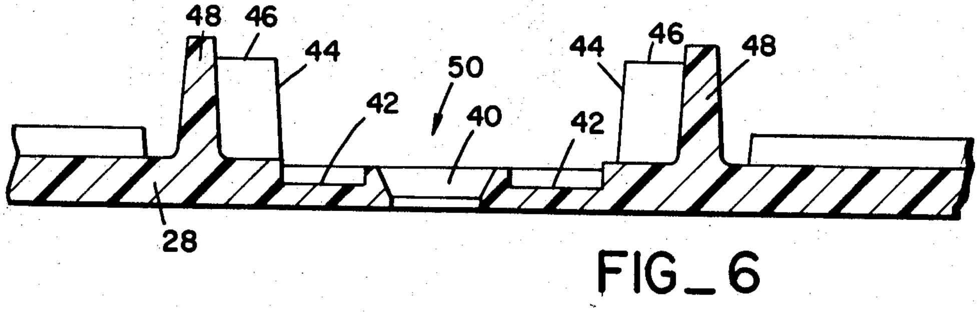
FIG. 6 is a fragmentary, enlarged cross-sectional view of the transducer positioning surface of a rigid plate on the interior of the cartridge and is taken on line 6—6 of FIG. 6.

Referring now to FIGS. 1, 4 and 5, transducer 18 is embedded in a generally H-shaped holder 74 and is positioned on the underside of the holder. The holder has a pair of laterally spaced runners 76 which have a flat underside 78. There are at least three spaced apart, angularly offset sliding pads 80 on the underside of the runners. Preferably two pads are at the ends of one runner and a third pad is at about the center of the other runner of the H-shaped holder. The H-shaped holder has a sufficient width so that the pads are fully supported on the guide surfaces 42 when the transducer is inside the cartridge as is more fully described hereinafter.

A generally C-shaped mounting bracket 82 is secured to holder 74. The mounting bracket comprises a pair of arms 84 which are spaced a distance equal to the spacing of ramps 44 on rigid plate 28. Tabs 86 and 88 extend inwardly from the arms and secure the H-shaped holder with rivets 90 or the like. A main body 92 of the bracket joins arms 84 and connects to an elongate leaf spring 94 mounted to linear motor 20. A center portion 96 of the main body is raised (see FIG. 4) and a portion of the center portion and of arms 84 slopes downwardly (as viewed in FIG. 4) at an angle of between about 15°–30°.

Leaf spring 94 has a sufficient length so that transducer 18 can be inserted in the cartridge to the innermost end of slot 40. The spring is slightly curved downwardly so that when the spring is relaxed sliding pads 80 of the H-shaped transducer holder 74 are slightly below guide surfaces 42. Free ends 98 of bracket arms 84 slope upwardly and are raised a sufficient distance so that they clear high points 46 of ramps 44.

Turning now to the operation of the transducer loading and positioning systme of the present invention and referring to FIGS. 1–7, cartridge 16 is conventionally positioned in disc drive 10 and the drive is energized to rotate the disc 22. As the disc rotates the Bernoulli effect moves the disc upwards towards rigid plate 28 and maintains the disc at a predetermined spacing therefrom. The free end of spring 94 mounting transducer 18 is conventionally secured to the linearly moving arm of linear motor 20. Arm movements are controlled by a computer (not shown).

As soon as disc drive 14 is energized ram 70 is lowered into aperture 66 to force the interior portion of leaf spring 56 down towards plate 28 and thereby uncover access opening 52. In response to the proper computer signal linear motor 20 advances the transducer towards the cartridge access opening. Center section 100 of the H-shaped transducer holder 74 can pass into the cartridge between ramps 44. However, the curved leaf spring 94 lowers the holder and mounting bracket 82 with respect to the access opening so that bracket arms 84 and in particular their free ends 98 engage and contact the ramp. The forward motion of the transducer now raises the mounting bracket, and therewith the H-shaped holder and the transducer slightly until the angularly inclined portions 102 of arms 84 arrive at sloped surfaces 104 of the ramps. Thereafter the continued forward motion of the transducer causes its simultaneous lowering under the downwardly biasing force of the curved mounting spring 94 until sliding pads 80 of H-shaped holder 74 engage the guide surfaces 42 on each side of slot 40. At that point the spacing between transducer 18 and the rotating disc 22 is directly controlled by the guide surfaces and is not influenced by the accuracy with which linear motor 20 mounts the cartridge or by the accuracy of special cartridge positioning ramps and/or linkages on the support structure of the disc drive. High positioning accuracy for the transducer is thereby obtained without excessively stringent manufacturing tolerances and the resulting high costs.

The linear transducer positioning motor can now move the transducer back and forth in accordance with computer commands. The triangular arrangement of sliding pads 40 stabilizes the cartridge against rolling or pitching motions. Lateral movements of the cartridge in passageway 50 are limited and controlled by the engagement of the outside edges of bracket arms 84 with walls 48 defining the transducer passageway.

A cartridge is replaced by fully retracting transducer 18 until holder 74 and mounting bracket 82 have moved completely past the access opening 52 in the cartridge. Thereafter, ram 70 is withdrawn and permits leaf spring 56 to relax so that its short leg 68 covers and closes access opening 52. Drive mechanism 14 is deenergized and the cartridge can be replaced with a new one.

I claim:

1. A system for registration of a linearly movable transducer mounted to transducer carrying means with respect to a recording disc in a disc cartridge comprising a rigid plate inside the cartridge overlying the disc, a sloped ramp on one side of the plate adjacent a periphery of the plate, rail means extending parallel to the ramp from about an end thereof towards a center of the plate and disposed in a plane parallel to the plane of the disc, means connected to the transducer carrying means for biasing the carrying means against the ramp and the rail means as the transducer moves linearly towards a center of the plate to thereby position the transducer and control its spacing from the disc with the plate overlying the disc.

2. A system according to claim 1 wherein the carrying means includes means for engaging the ramp and means for engaging the rail means.

3. A system according to claim 1 wherein the carrying means includes means for engaging the rail means and for stabilizing the transducer against pitch and roll motions.

4. A system according to claim 3 wherein the stabilizing means comprises at least three spaced apart, angularly offset pads.

5. A system according to claim 1 including an elongate slot in the plate aligned with the linear travel of the transducer, wherein the ramp comprises a pair of spaced apart ramps straddling the slot, and wherein the rail means comprises a guide surface on each side of the slot extending from about an end of the ramp past a centermost end of the slot.

6. A system according to claim 1 wherein the cartridge encapsules the disc and the plate, and wherein the capsule defines an opening in alignment with the ramp and the rail means and having a sufficient size to permit entry of the transducer, and including means normally closing the opening, and means for opening the opening to permit entry of the transducer into the cartridge and movement of the transducer therein.

7. A system according to claim 6 wherein the normally closed means comprises leaf spring means normally biased into a closing position and extending over a portion of a flat surface of the cartridge, and wherein the means for opening the spring means comprises means engaging the spring means and forcing a portion of the spring means covering the opening away from the opening.

8. A system according to claim 7 wherein a portion of the spring means adjacent the opening is disposed on the exterior of the cartridge and another portion of the spring means is disposed interiorly of the cartridge, wherein the cartridge defines an opening overlying the interior portion, and wherein the means for forcing the spring open comprises ram means mounted to a support structure for the cartridge in alignment with the cartridge aperture, and means for selectively moving the ram means past the aperture against the interior portion to thereby deflect the spring means and move the exterior portion away from the opening.

9. In a disc drive having a support structure, a linearly movable transducer, a data storage disc housed in a cartridge having an access opening permitting entrance of the transducer into the cartridge in a radial direction, and means for rotating the disc, the improvement comprising: means disposed interiorly of the cartridge defining a guide surface for the transducer which is parallel to the plane in which the disc rotates, means defining a ramp interiorly of the cartridge which is angularly inclined with respect to the surface and positioned adjacent the opening, and means mounting the transducer for successively slideably contacting the ramp and the surface as the transducer moves from the opening towards the center of the disc to thereby guide and position the transducer with respect to the disc.

10. A disc drive according to claim 9 including a plate disposed within the cartridge, and wherein the means defining the surface and the means defining the ramp are integrally constructed with the plate, and wherein the plate further includes an elongate, radially oriented opening parallel to the surface and positioned along the travel path of the transducer for positioning the transducer closely adjacent the rotating storage disc.

11. A disc drive according to claim 9 including spring means for biasing the mounting means into contact with the ramp and the surface.

12. A disc drive according to claim 11 wherein the mounting means comprises slide arms positioned for engaging the ramp only and a plurality of sliding pads which are independent of the sliding arms and distributed to engage the surface and stabilize the transducer against pitching, rolling and tilting motions as it moves along the surface.

13. A disc drive comprising a support structure, means removably mounting a disc cartridge including an aperture communicating the interior of the cartridge with the exterior, a transducer, means for linearly moving the transducer radially towards and away from a center of rotation of a disc in the cartridge through the access opening, a leaf spring having a first portion disposed exteriorly of the cartridge covering the opening and a second portion disposed interiorly of the cartridge, means securing a free end of the second portion to the cartridge, the cartridge defining an aperture overlying the second portion and a void space beneath a part of the second portion aligned with the aperture, contact means mounted to the support, and means for selectively forcing the contact means through the aperture against the part to deflect the part into the void space and thereby move the first portion of the spring and uncover the access opening to permit entrance of the transducer into the cartridge.

14. A disc drive according to claim 13 wherein the entrance opening is in a sidewall of the cartridge, wherein the leaf spring extends at least partially across a face of the cartridge, and wherein the leaf spring has a generally L-shaped configuration defining a relatively short leg for covering the access opening.

15. A disc drive comprising a support structure, means for removably mounting a data storage disc cartridge on the support structure, the cartridge including an access opening at its periphery, means for rotating a data storage disc in the cartridge, a transducer, a linear transducer positioning motor, elongate leaf spring means secured to the motor and having a free end mounting the transducer for linear movement of the transducer past the opening into the cartridge towards and away from the center of rotation of the disc, and means disposed interiorly of the cartridge for guiding and positioning the free spring end over the full extent of its travel within the cartridge to guide the transducer and position it with respect to the rotating disc.

16. A disc drive according to claim 15 including means for physically separating the rotating disc and the transducer for preventing physical contact between them.

17. A disc drive according to claim 15 wherein the guiding and positioning means is located in the travel path of the free spring end when the spring is in its relaxed position to intercept the free end once it enters the access opening so that the free end of the spring leaf is biased into contact with the guiding and positioning means.

18. A disc drive according to claim 17 wherein the guiding and positioning means is positioned to contact the free spring end during all possible operative spring end locations within the cartridge.

19. A disc drive according to claim 15 wherein the travel path of the leaf spring is on one side of the disc, and wherein the leaf spring has a longitudinal shape when relaxed so that a perpendicular distance between the disc side and the free spring end is less than such spacing between the disc side and an end of the spring secured to the linear motor.

20. A disc drive according to claim 19 wherein the leaf spring is longitudinally curved.

21. A data storage disc cartridge comprising a housing defining a space for rotating a data storage disc, a rigid center plate overlying the space and including an elongate slot extending from adjacent a periphery of the housing towards a center thereof in a radial direction, the housing including an access opening aligned with the slot and positioned to provide communication to a housing interior on a side of the disc facing away from the space, the side of the plate defining an elongate, flat guidance surface on each side of the slot extending over substantially the full length of the slot, and elongate, relatively short ramps laterally spaced from the surfaces and positioned adjacent the periphery of the plate and the access opening, the ramps sloping from a high point at the plate periphery towards the side of the plate, whereby a transducer can be placed on the surfaces by moving it along the ramps for positioning and registration with respect to a disc rotating in the cartridge space.

22. A cartridge according to claim 21 including normally closed means covering the opening to prevent contamination of and damage to the housing interior.

23. A cartridge according to claim 22 wherein the plate and the housing define a void on the side of the plate fitted with the surfaces and ramps, the void extending from about a center of the plate in a radial direction to the plate periphery, wherein the normally closed means comprises a leaf spring extending from about the center of the plate to the periphery thereof, a first portion of the leaf spring being disposed on the interior of the housing in the void and a second portion being disposed on the exterior of the housing and closing the opening.

24. A cartridge according to claim 23 including means securing a free end of the first spring portion to the housing interior, and wherein the housing defines an edge in contact with the spring, positioned where the first and second spring portions meet and oriented perpendicular with respect to the longitudinal extent of the spring, wherein the housing further defines an aperture overlying the first portion so that the first portion can be deflected into the void whereby the second spring portion pivots about the edge and moves and uncovers the opening while release of the first portion automatically returns the spring to its relaxed position in which the opening is covered.

* * * * *